United States Patent
Paczkowski et al.

(10) Patent No.: US 9,374,363 B1
(45) Date of Patent: Jun. 21, 2016

(54) RESTRICTING ACCESS OF A PORTABLE COMMUNICATION DEVICE TO CONFIDENTIAL DATA OR APPLICATIONS VIA A REMOTE NETWORK BASED ON EVENT TRIGGERS GENERATED BY THE PORTABLE COMMUNICATION DEVICE

(71) Applicant: Sprint Communications Company L.P., Overland Park, KS (US)

(72) Inventors: Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 86 days.

(21) Appl. No.: 13/844,282

(22) Filed: Mar. 15, 2013

(51) Int. Cl.
| | | |
|---|---|---|
| *G06F 7/04* | (2006.01) | |
| *H04L 29/06* | (2006.01) | |
| *G06F 21/32* | (2013.01) | |

(Continued)

(52) U.S. Cl.
CPC .............. *H04L 63/083* (2013.01); *G06F 21/10* (2013.01); *G06F 21/32* (2013.01); *H04L 63/08* (2013.01)

(58) Field of Classification Search
CPC ....... G06F 19/322; G06F 21/10; G06F 21/32; G06F 2221/0708; G06F 2221/2111; G06F 2221/2149; G06F 3/04817; G06F 9/4443; G06F 9/4446; H04L 63/08; H04L 67/18; H04L 67/24; H04L 67/306; H04L 67/34
USPC ........................................................ 726/4, 3
See application file for complete search history.

(56) References Cited

U.S. PATENT DOCUMENTS

| | | |
|---|---|---|
| 5,303,378 A | 4/1994 | Cohen |
| 5,321,735 A | 6/1994 | Breeden et al. |

(Continued)

FOREIGN PATENT DOCUMENTS

| | | |
|---|---|---|
| WO | WO2011025433 A1 | 3/2011 |
| WO | WO2012064171 A1 | 5/2012 |

(Continued)

OTHER PUBLICATIONS

Trusted Computing Second International Conference, Trust 2009 "Implementation Aspects of Mobile and Embedded Trusted Computing" Kurt Dietrich and Johannes Winter.*

(Continued)

*Primary Examiner* — Evans Desrosiers
*Assistant Examiner* — Gary Gracia

(57) ABSTRACT

Systems and methods disclosed herein relate to the protection of a plurality of protected personas on a protected network that may be isolated from a telecommunication service provider's network that supports a portable electronic device. The plurality of personas may be generated by the owners and/or administrators of the network on which the personas reside. Activating a persona on a device, whether that device is owned and maintained by the business or businesses affiliated with the protected network, enables access to a plurality of data on the business's network and restricts access to at least some of the capabilities and functionality of the device available under the original persona. Data created or modified while the protected persona is activated on the device may not be accessed while the original persona is active and may be uploaded dynamically or manually to the protected network.

18 Claims, 7 Drawing Sheets

(51) Int. Cl.
*G06F 21/10* (2013.01)
*G06F 17/30* (2006.01)

(56) References Cited

U.S. PATENT DOCUMENTS

| | | |
|---|---|---|
| 5,764,889 A | 6/1998 | Ault et al. |
| 5,796,952 A | 8/1998 | Davis et al. |
| 6,131,024 A | 10/2000 | Boltz |
| 6,177,860 B1 | 1/2001 | Cromer et al. |
| 6,219,712 B1 | 4/2001 | Mann et al. |
| 6,363,150 B1 | 3/2002 | Bhagavath et al. |
| 6,477,180 B1 | 11/2002 | Aggarwal et al. |
| 6,507,869 B1 | 1/2003 | Franke et al. |
| 6,507,904 B1 | 1/2003 | Ellison et al. |
| 6,614,893 B1 | 9/2003 | Paiz |
| 6,668,322 B1 | 12/2003 | Wood et al. |
| 6,691,230 B1 | 2/2004 | Bardon |
| 6,754,784 B1 | 6/2004 | North et al. |
| 6,823,454 B1 | 11/2004 | Hind et al. |
| 6,824,064 B2 | 11/2004 | Guthery et al. |
| 6,895,234 B1 | 5/2005 | Laursen et al. |
| 7,043,241 B1 | 5/2006 | Sladek et al. |
| 7,069,234 B1 | 6/2006 | Cornelius et al. |
| 7,366,806 B2 | 4/2008 | Milenkovic et al. |
| 7,387,240 B2 | 6/2008 | Ziegler |
| 7,519,824 B1 | 4/2009 | Peyravian et al. |
| 7,552,467 B2 | 6/2009 | Lindsay |
| 7,571,364 B2 | 8/2009 | Whetsel |
| 7,574,382 B1 | 8/2009 | Hubert |
| 7,650,645 B1 | 1/2010 | Langendorf et al. |
| 7,716,720 B1 | 5/2010 | Marek et al. |
| 7,761,558 B1 | 7/2010 | Jindal et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,316,237 B1 | 11/2012 | Felsher et al. |
| 8,331,337 B2 | 12/2012 | Kambe et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 * | 8/2013 | Cope ............... H04M 1/7253 455/41.1 |
| 8,583,091 B1 | 11/2013 | Delker et al. |
| 8,588,749 B1 * | 11/2013 | Sadhvani et al. ......... 455/412.2 |
| 8,631,247 B2 | 1/2014 | O'Loughlin et al. |
| 8,632,000 B2 | 1/2014 | Laracey |
| 8,649,770 B1 | 2/2014 | Cope et al. |
| 8,650,492 B1 | 2/2014 | Mui et al. |
| 8,661,119 B1 | 2/2014 | Jindal et al. |
| 8,667,607 B2 | 3/2014 | Paczkowski et al. |
| 8,681,969 B1 | 3/2014 | Rodde et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,737,965 B2 | 5/2014 | McCown et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia Martin et al. |
| 8,811,971 B2 | 8/2014 | Corda et al. |
| 8,831,998 B2 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,886,925 B2 * | 11/2014 | Qureshi et al. ............... 713/150 |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 9,161,227 B1 | 10/2015 | Bye et al. |
| 9,161,325 B1 | 10/2015 | Urbanek |
| 9,171,243 B1 | 10/2015 | Cordes et al. |
| 9,183,412 B2 | 11/2015 | Bye et al. |
| 9,183,606 B1 | 11/2015 | Paczkowski et al. |
| 9,185,626 B1 | 11/2015 | Kunkel et al. |
| 9,191,388 B1 | 11/2015 | Paczkowski et al. |
| 9,191,522 B1 | 11/2015 | Krieger et al. |
| 9,208,339 B1 | 12/2015 | Paczkowski et al. |
| 9,210,576 B1 | 12/2015 | Cope et al. |
| 9,215,180 B1 | 12/2015 | Bertz et al. |
| 9,226,145 B1 | 12/2015 | Loman et al. |
| 9,230,085 B1 | 1/2016 | Paczkowski et al. |
| 9,268,959 B2 | 2/2016 | Paczkowski et al. |
| 9,271,110 B1 | 2/2016 | Fultz et al. |
| 9,282,898 B2 | 3/2016 | McRoberts et al. |
| 2001/0041591 A1 | 11/2001 | Carroll |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0216143 A1 * | 11/2003 | Roese et al. ............... 455/456.1 |
| 2003/0229514 A2 | 12/2003 | Brown |
| 2003/0237002 A1 | 12/2003 | Oishi et al. |
| 2004/0064351 A1 | 4/2004 | Mikurak |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Ringborg et al. |
| 2004/0264372 A1 | 12/2004 | Huang |
| 2005/0015601 A1 | 1/2005 | Tabi |
| 2005/0045719 A1 | 3/2005 | Yang |
| 2005/0052994 A1 | 3/2005 | Lee |
| 2005/0091505 A1 | 4/2005 | Riley et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0181796 A1 | 8/2005 | Kumar et al. |
| 2005/0228892 A1 | 10/2005 | Riley et al. |
| 2005/0235166 A1 | 10/2005 | England et al. |
| 2005/0239481 A1 * | 10/2005 | Seligmann ............... 455/456.2 |
| 2005/0272445 A1 * | 12/2005 | Zellner ............... 455/456.2 |
| 2005/0289355 A1 | 12/2005 | Kitariev et al. |
| 2006/0030291 A1 | 2/2006 | Dawson et al. |
| 2006/0036851 A1 | 2/2006 | DeTreville |
| 2006/0040641 A1 | 2/2006 | Dawson et al. |

(56) References Cited

U.S. PATENT DOCUMENTS

| | | |
|---|---|---|
| 2006/0074544 A1 | 4/2006 | Morariu et al. |
| 2006/0129488 A1 | 6/2006 | Vincent |
| 2006/0156026 A1 | 7/2006 | Utin |
| 2006/0164978 A1 | 7/2006 | Werner et al. |
| 2006/0168637 A1 | 7/2006 | Vysotsky et al. |
| 2006/0171537 A1 | 8/2006 | Enright |
| 2006/0190605 A1 | 8/2006 | Franz et al. |
| 2006/0212589 A1 | 9/2006 | Hayer et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0104215 A1 | 5/2007 | Wang et al. |
| 2007/0118880 A1 | 5/2007 | Mauro, II |
| 2007/0143210 A1 | 6/2007 | Yeung et al. |
| 2007/0150730 A1* | 6/2007 | Conti .................. G06F 21/52 713/166 |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2007/0280245 A1 | 12/2007 | Rosberg |
| 2007/0283449 A1 | 12/2007 | Blum et al. |
| 2008/0005794 A1 | 1/2008 | Inoue et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0022389 A1 | 1/2008 | Calcev et al. |
| 2008/0051142 A1 | 2/2008 | Calvet et al. |
| 2008/0092213 A1 | 4/2008 | Wei et al. |
| 2008/0097793 A1 | 4/2008 | Dicks et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0168515 A1 | 7/2008 | Benson et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2009/0047923 A1* | 2/2009 | Jain et al. .................. 455/404.1 |
| 2009/0049220 A1* | 2/2009 | Conti .................. G06F 13/24 710/267 |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0204959 A1* | 8/2009 | Anand .................. G06F 9/5027 718/1 |
| 2009/0227290 A1 | 9/2009 | Chien |
| 2009/0248445 A1 | 10/2009 | Harnick |
| 2009/0271321 A1 | 10/2009 | Stafford |
| 2009/0281947 A1 | 11/2009 | Erel |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0075669 A1 | 3/2010 | Sparks et al. |
| 2010/0077487 A1* | 3/2010 | Travis et al. .................. 726/28 |
| 2010/0082977 A1 | 4/2010 | Boyle et al. |
| 2010/0125512 A1 | 5/2010 | Jones et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0030030 A1 | 2/2011 | Terpening et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1* | 3/2011 | Mohler et al. .................. 726/3 |
| 2011/0078081 A1 | 3/2011 | Pirzadeh et al. |
| 2011/0082711 A1 | 4/2011 | Poeze et al. |
| 2011/0107426 A1 | 5/2011 | Yen et al. |
| 2011/0112968 A1 | 5/2011 | Floreck et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145923 A1 | 6/2011 | Largman et al. |
| 2011/0145926 A1 | 6/2011 | Dalcher et al. |
| 2011/0151836 A1 | 6/2011 | Dadu et al. |
| 2011/0154032 A1 | 6/2011 | Mauro, II |
| 2011/0166883 A1* | 7/2011 | Palmer et al. .................. 705/3 |
| 2011/0173090 A1 | 7/2011 | Miller et al. |
| 2011/0202916 A1 | 8/2011 | VoBa et al. |
| 2011/0208797 A1* | 8/2011 | Kim .................. 709/202 |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258462 A1 | 10/2011 | Robertson et al. |
| 2011/0269456 A1 | 11/2011 | Krishnaswamy et al. |

(56) References Cited

U.S. PATENT DOCUMENTS

| | | |
|---|---|---|
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0083242 A1* | 4/2012 | Spitz ............... H04L 63/08 455/406 |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1* | 6/2012 | Kim et al. ............... 345/530 |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0297202 A1* | 11/2012 | Gallet ............... G06F 1/3203 713/189 |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0003543 A1 | 1/2013 | Ludwig |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1* | 3/2013 | Chowdhry ............... G06F 21/74 718/1 |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0097657 A1* | 4/2013 | Cardamore et al. ............. 726/1 |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1* | 5/2013 | Ferguson et al. ............. 707/821 |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0231098 A1 | 9/2013 | Jonas et al. |
| 2013/0252583 A1 | 9/2013 | Brown et al. |
| 2013/0262264 A1 | 10/2013 | Karstoft |
| 2013/0263212 A1 | 10/2013 | Faltyn et al. |
| 2013/0290709 A1* | 10/2013 | Muppidi et al. ............. 713/168 |
| 2013/0305333 A1 | 11/2013 | Katzer et al. |
| 2013/0310003 A1 | 11/2013 | Sadhvani Rita et al. |
| 2013/0331067 A1 | 12/2013 | Coussemaeker et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1* | 1/2014 | Qureshi ............... G06F 21/10 726/16 |
| 2014/0033316 A1 | 1/2014 | Paczkowski et al. |
| 2014/0047548 A1 | 2/2014 | Bye et al. |
| 2014/0059642 A1* | 2/2014 | Deasy et al. .................. 726/1 |
| 2014/0074508 A1* | 3/2014 | Ying et al. .................. 705/3 |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0155025 A1 | 6/2014 | Parker et al. |
| 2014/0173747 A1* | 6/2014 | Govindaraju ............... 726/27 |
| 2014/0188412 A1 | 7/2014 | Mahajan et al. |
| 2014/0188738 A1 | 7/2014 | Huxham |
| 2014/0215196 A1 | 7/2014 | Berlin |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279558 A1 | 9/2014 | Kadi et al. |
| 2014/0281544 A1 | 9/2014 | Paczkowski et al. |
| 2014/0298026 A1 | 10/2014 | Isozaki et al. |

(56) References Cited

U.S. PATENT DOCUMENTS

| | | |
|---|---|---|
| 2015/0106805 A1 | 4/2015 | Melander et al. |
| 2015/0169885 A1 | 6/2015 | Paczkowski et al. |
| 2015/0172928 A1 | 6/2015 | Katzer et al. |
| 2016/0004876 A1 | 1/2016 | Bye et al. |

FOREIGN PATENT DOCUMENTS

| | | |
|---|---|---|
| WO | 2013170228 A2 | 11/2013 |
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Advisory Action dated Jun. 23, 2014, U.S. Appl. No. 13/571,348, filed Aug. 10, 2012.
Notice of Allowance dated Jun. 4, 2014, U.S. Appl. No. 13/557,213, filed Jul. 25, 2012.
FAIPP Pre-Interview Communication dated Aug. 4, 2014, U.S. Appl. No. 13/844,357, filed Mar. 15, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Foreign Communication from a Related Counterpart—International Search Report and Written Opinion, dated Jul. 11, 2014, PCT/US14/16651, filed on Feb. 16, 2014.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. 13/786,450.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Final Office Action dated Sep. 9, 2013, U.S. Appl. No. 13/440,980, filed Apr. 5, 2012.
Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
Notice of Allowance dated May 27, 2014, U.S. Appl. No. 13/482,731, filed May 29, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
Final Office Action dated Apr. 10, 2014, U.S. Appl. No. 13/571,348, filed Aug. 10, 2012.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Foreign Communication from a Related Counterpart—International Search Report and Written Opinion, dated Apr. 22, 2014, PCT/US13/53617, filed Aug. 5, 2013.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
FAIPP Pre-Interview Communication dated Jun. 6, 2013, U.S. Appl. No. 13/571,348, filed Aug. 10, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Cope, Warren B., et al., "Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.
Bye, Stephen James, et al., "Near Field Communication Authentication and Validation to Access Corporate Data", filed May 3, 2012, U.S. Appl. No. 13/463,801.

(56) References Cited

OTHER PUBLICATIONS

Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal", filed Nov. 11, 2011, U.S. Appl. No. 13/294,177.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.

Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Notice of Allowance dated Nov. 29, 2013, U.S. Appl. No. 13/440,980, filed Apr. 5, 2012.
Office Action dated Dec. 19, 2013, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
FAIPP Pre-Interview Communication dated Mar. 20, 2014, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
Notice of Allowance dated Dec. 22, 2014, U.S. Appl. No. 13/470,203, filed May 11, 2012.
Notice of Allowance dated Feb. 5, 2015, U.S. Appl. No. 13/533,969, filed Jun. 27, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
Notice of Allowance dated Dec. 3, 2014, U.S. Appl. No. 13/594,777, filed Aug. 25, 2012.
First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
Notice of Allowance dated Dec. 19, 2014, U.S. Appl. No. 13/844,325, filed Mar. 15, 2013.

(56) References Cited

OTHER PUBLICATIONS

Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 25, 2015, U.S. Appl. No. 14/163,047, filed Jan. 24, 2014.
Restriction Requirement dated Jan. 5, 2015, U.S. Appl. No. 13/857,139, filed Apr. 4, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Preliminary Report on Patentability, dated Feb. 5, 2015, PCT/US13/51750, filed on Jul. 24, 2013.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Paczkowski, Lyle W., et al., "Trusted Code Generation and Verification to Prevent Fraud from Maleficent External Devices that Capture Data", filed Jan. 14, 2015, U.S. Appl. No. 14/592,218.
FAIPP Pre-Interview Communication dated Jan. 22, 2015, U.S. Appl. No. 13/544,802, filed Jul. 9, 2012.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http://ieeexplore.ieee.org/stamp/stamp.jsp?tp=&arnumber= 1617569.
Fultz, David K., et al., "Location Awareness Session Management and Cross Application Session Management," filed Jul. 9, 2012, U.S. Appl. No. 13/544,802.
Final Office Action dated Nov. 6, 2015, U.S. Appl. No. 14/632,850, filed Feb. 26, 2015.
FAIPP Office Action Sep. 15, 2015, U.S. Appl. No. 13/532,588, filed Jun. 25, 2012.

Notice of Allowance dated Nov. 5, 2015, U.S. Appl. No. 13/532,588, filed Jun. 25, 2012.
Supplemental Notice of Allowance dated Nov. 16, 2015, U.S. Appl. No. 13/532,588, filed Jun. 25, 2012.
Notice of Allowance dated Sep. 21, 2015, U.S. Appl. No. 14/148,714, filed Jan. 6, 2014.
Notice of Allowance dated Nov. 9, 2015, U.S. Appl. No. 14/659,614, filed Mar. 17, 2015.
Advisory Action dated Nov. 16, 2015, U.S. Appl. No. 13/802,404, filed Mar. 13, 2013.
FAIPP Pre-Interview Communication dated Nov. 18, 2015, U.S. Appl. No. 14/681,077, filed Apr. 7, 2015.
Office Action dated Nov. 19, 2015, U.S. Appl. No. 13/857,139, filed Apr. 4, 2013.
Foreign Communication from a Related Counterpart—International Preliminary Report on Patentability, dated Sep. 24, 2015, PCT/US14/16651, filed on Feb. 16, 2014.
Bye, Stephen James, et al., "Systems and Methods for Provisioning and Using Multiple Trusted Security Zones on an Electronic Device," filed Sep. 15, 2015, U.S. Appl. No. 14/855,364.
Notice of Allowance dated Oct. 19, 2015, U.S. Appl. No. 13/544,802, filed Jul. 9, 2012.
FAIPP Pre-Interview Communication dated Mar. 25, 2015, U.S. Appl. No. 13/532,588, filed Jun. 25, 2012.
FAIPP Pre-Interview Communication dated Mar. 10, 2015, U.S. Appl. No. 13/762,319, filed Feb. 7, 2013.
FAIPP Pre-Interview Communication dated May 21, 2015, U.S. Appl. No. 14/090,667, filed Nov. 26, 2013.
Final Office Action dated Apr. 7, 2015, U.S. Appl. No. 13/844,145, filed Mar. 15, 2013.
First Action Interview Office Action dated Apr. 7, 2015, U.S. Appl. No. 13/802,404, filed Mar. 13, 2013.
FAIPP Pre-Interview Communication dated Mar. 26, 2015, U.S. Appl. No. 13/939,175, filed Jul. 10, 2013.
FAIPP Pre-Interview Communication dated Mar. 24, 2015, U.S. Appl. No. 13/964,112, filed Aug. 12, 2013.
FAIPP Pre-Interview Communication dated Apr. 15, 2015, U.S. Appl. No. 14/085,474, filed Nov. 20, 2013.
First Action Interview Office Action dated Apr. 10, 2015, U.S. Appl. No. 14/075,663, filed Nov. 8, 2013.
Notice of Allowance dated Apr. 9, 2015, U.S. Appl. No. 14/163,047, filed Jan. 24, 2014.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, 2015, U.S. Appl. No. 14/681,077.
Office Action dated Apr. 14, 2015, U.S. Appl. No. 13/544,802, filed Jul. 9, 2012.
Notice of Allowance dated May 29, 2015, U.S. Appl. No. 14/085,474, filed Nov. 20, 2013.
FAIPP Pre-Interview Communication dated Jul. 2, 2015, U.S. Appl. No. 14/632,850, filed Feb. 26, 2015.
Notice of Allowance dated Jun. 17, 2015, U.S. Appl. No. 13/571,348, filed Aug. 10, 2012.
Notice of Allowance dated Jun. 9, 2015, U.S. Appl. No. 13/762,319, filed Feb. 7, 2013.
Notice of Allowance dated Aug. 4, 2015, U.S. Appl. No. 14/090,667, filed Nov. 26, 2013.
Notice of Allowance dated Jul. 6, 2015, U.S. Appl. No. 13/844,145, filed Mar. 15, 2013.
Notice of Allowance dated Jul. 6, 2015, U.S. Appl. No. 14/066,661, filed Oct. 29, 2013.
Notice of Allowance dated Aug. 14, 2015, U.S. Appl. No. 13/594,779, filed Aug. 25, 2012.
Final Office Action dated Aug. 27, 2015, U.S. Appl. No. 13/802,404, filed Mar. 13, 2013.
Notice of Allowance dated Jul. 7, 2015, U.S. Appl. No. 13/939,175, filed Jul. 10, 2013.

(56) References Cited

OTHER PUBLICATIONS

Notice of Allowance dated Aug. 3, 2015, U.S. Appl. No. 13/964,112, filed Aug. 12, 2013.
Notice of Allowance dated Jul. 1, 2015, U.S. Appl. No. 14/075,663, filed Nov. 8, 2013.
Notice of Allowance dated Jul. 22, 2015, U.S. Appl. No. 14/229,532, filed Mar. 28, 2014.
Notice of Allowance dated Aug. 28, 2015, U.S. Appl. No. 14/446,330, filed Jul. 29, 2014.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139 filed Apr. 4, 2013.
Notice of Allowance dated Jun. 11, 2015, U.S. Appl. No. 13/857,138, filed Apr. 4, 2013.
Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf.
Advisory Action dated Jan. 29, 2016, U.S. Appl. No. 14/632,850, filed Feb. 26, 2015.
FAIPP Pre-Interview Communication dated Mar. 1, 2016, U.S. Appl. No. 13/863,376, filed Apr. 15, 2013.
Restriction Requirement dated Jan. 12, 2016, U.S. Appl. No. 13/912,190, filed Jun. 6, 2013.
FAIPP Pre-Interview Communication dated Mar. 11, 2016, U.S. Appl. No. 13/912,190, filed Jun. 6, 2013.
Notice of Allowance dated Dec. 17, 2015, U.S. Appl. No. 13/857,141, filed on Apr. 4, 2013.
McRoberts, Leo Michael, et al., "End-to-End Trusted Communications Infrastructure," filed Jan. 25, 2016, U.S. Appl. No. 15/005,123.
Cordes, Kevin R., et al., "Digest of Biographical Information for an Electronic Device with Static and Dynamic 3ortions," filed on Mar. 14, 2016, U.S. Appl. No. 15/069,921.

\* cited by examiner

RESTRICTING ACCESS OF A PORTABLE COMMUNICATION DEVICE TO CONFIDENTIAL DATA OR APPLICATIONS VIA A REMOTE NETWORK BASED ON EVENT TRIGGERS GENERATED BY THE PORTABLE COMMUNICATION DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A portable electronic device such as a tablet, laptop computer, personal digital assistant (PDA), mobile phone, or multi-functional portable electronic device may comprise a user interface. The user interface may present icons for selection that provide access to local and network applications, data, and systems. The portable electronic device may also comprise audio, video, or other recording technology that a user of the device may be able to access through either the user interface and/or physical components of the device such as volume control, locking features, and power features. Due to the increasing processing power of portable electronic devices, these devices may be used in personal and professional capacities by the device owners.

SUMMARY

In an embodiment, a method of protecting information on a hospital network comprising: activating, by an application on a portable electronic device, in response to a first trigger, a hospital persona accessible through a hospital network, wherein the first trigger comprises at least one of a manual or a dynamic trigger, wherein activating the hospital persona comprises deactivating access to an original persona on the portable electronic device. The embodiment further comprising: wherein the hospital persona comprises a first plurality of data, a first plurality of applications, and a plurality of access rights to at least one of the hospital network and a first plurality of software, hardware, and firmware on the portable electronic device; and accessing, by the portable electronic device, a plurality of data associated with the hospital persona, wherein accessing the plurality of data comprises creating or modifying the data. The embodiment further comprising, deactivating, by the application, in response to a second trigger comprising at least one of the manual or the dynamic trigger, at least a portion of the plurality of data associated with the hospital persona, wherein the portion of the plurality of data was one of created or modified while the hospital persona was activating on the portable electronic device, wherein deactivating comprises: determining if the second trigger is the manual trigger or the dynamic trigger; activating, in response to a determination that the second trigger is the manual trigger, at least the portion of the plurality of data to the hospital network; activating, in response to the determination that the second trigger is the dynamic trigger, at least the portion of the plurality of data to a trusted security zone on the portable electronic device; reactivating, in response to the second trigger, the original persona on the portable electronic device.

In an embodiment, a system for protecting access to information on a hospital network comprising: a plurality of personas accessible through a hospital network; a portable electronic device on a telecommunications service provider network comprising an application and an original persona. The embodiment further comprising: wherein the original persona is not a persona of the plurality of the personas on the hospital network, wherein each persona of the plurality of personas on the hospital network comprises a first plurality of data, a first plurality of applications, and a first plurality of access rights to the hospital network and at least one of software, hardware, and firmware on the portable electronic device, and wherein the original persona comprises a second plurality of data, a second plurality of applications, and a second plurality of access rights to at least one of software, hardware, and firmware on the portable electronic device and the telecommunications service provider network. The embodiment further comprising: wherein the application: activates, in response to a first trigger, a first hospital persona of the plurality of personas, wherein the first trigger is one of a manual trigger or a dynamic trigger, and wherein activating the first hospital persona deactivates access to the original persona; deactivates, in response to a second trigger, the first hospital persona and activates a second hospital persona, and wherein the second trigger is one of the manual trigger or the dynamic trigger; and deactivates, in response to a third trigger, the second hospital persona and reactivates the first hospital persona or reactivates the original persona, wherein the third trigger is one of the manual trigger or the dynamic trigger.

In an alternate embodiment, a method of protecting information a network comprising: activating, by the application on a portable electronic device, in response to a trigger, a first persona of a plurality of personas, wherein the trigger comprises at least one of a manual or a dynamic trigger, wherein the portable electronic device comprises an original persona, wherein activating the first persona deactivates access to the original persona, wherein the original persona is not a persona of the plurality of personas, wherein each persona of the plurality of personas and the original persona comprise a first plurality of data, a first plurality of applications, and a first plurality of access rights to the telecommunications service provider network and a plurality of software, hardware, and firmware on the portable electronic device, and wherein the original persona comprises a second plurality of data, a second plurality of applications, and a second plurality of access rights to at least one of software, hardware, and firmware on the portable electronic device and the telecommunications service provider network. The embodiment further comprising: activating, by the application, at least a portion of the first persona to at least one of a remote network and a trusted security zone in response to deactivating the second persona, wherein the remote network is not the network that supports the original persona; and reactivating the original persona on the portable electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description.

DETAILED DESCRIPTION

Figure 1:
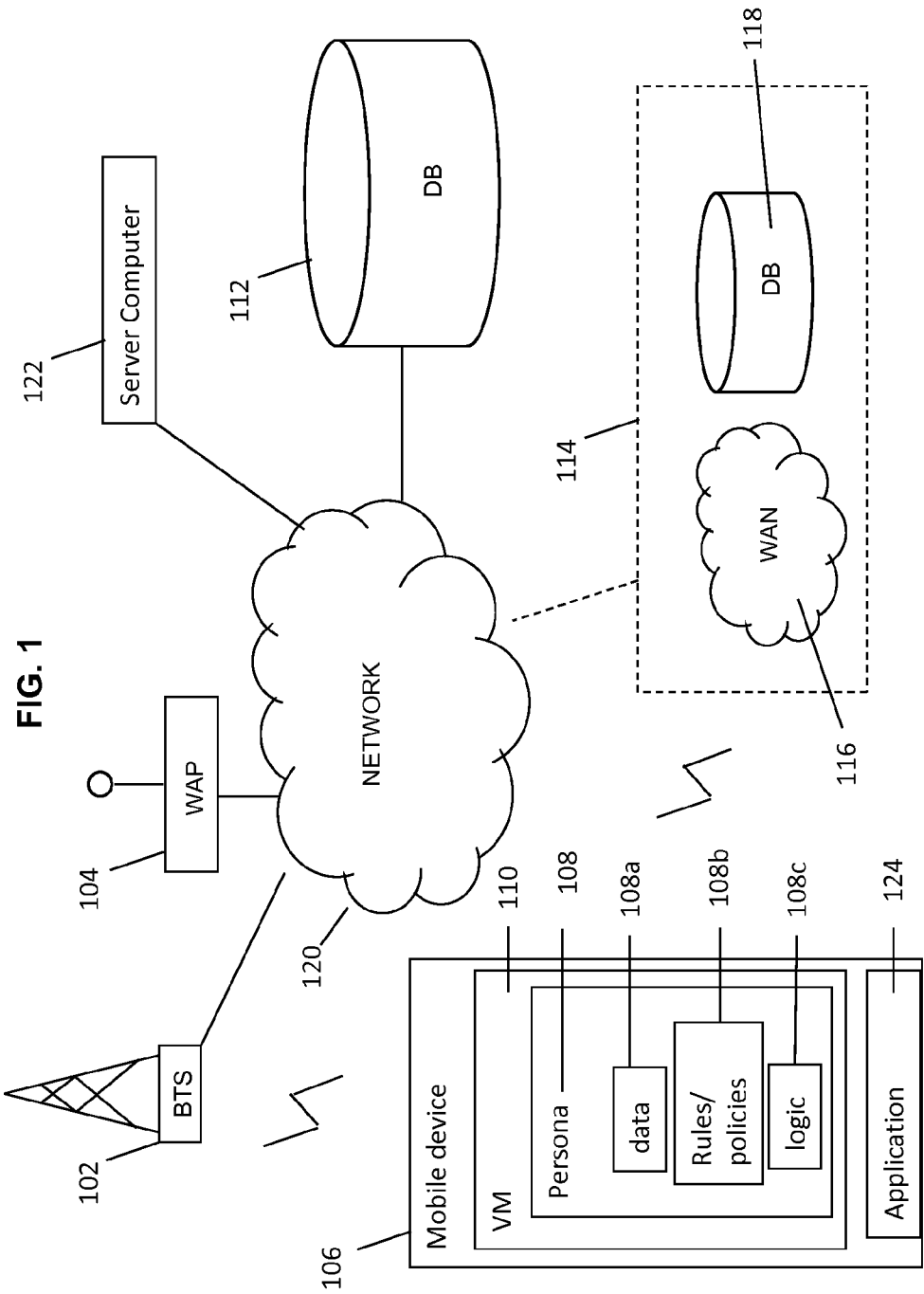
FIG. 1 is a system for implementing methods according to embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Businesses including hospitals, manufacturing environments, finance centers, and research & development centers may have an interest in protecting confidential data and the systems on which that data is generated and stored. As such, these businesses may want to restrict access that a portable communication device has to confidential data or applications. This may be accomplished by using a remote network where the restriction is based on event triggers generated by the portable communication device. Hospitals in particular may have a variety of confidential information concerning patients and prescription inventory that the hospital may not want accessed by unauthorized individuals and/or under uncontrolled conditions. In some cases, the information that the hospital or other business seeks to protect may be protected by state and/or federal law. For example, the Health Insurance Portability and Accountability Act of 1996 (HIPAA) was enacted to provide federal protections for personal health information and provide patients a plurality of rights associated with those protections. Among other provisions, HIPAA mandates the protection of patient data and appropriate authorization to access that data. Protected data, in some cases, may only be accessed by an authorized party such as an employee or vendor of the hospital or a relative of the patient who has the appropriate access authorization given by a patient or other competent party. Portable electronic devices capable of accessing this sort of information—with or without authorization—may be owned by hospital employees, visitors, patients, and vendors. The hospital or other business may want people, in particular its authorized employees, to be able to access hospital information and resources on portable electronic devices. Portable electronic devices such as tablets, notebooks, mobile phones, laptops, and portable digital assistants (PDA) may be provided by the hospital to all or some of its employees. In that scenario, the hospital may incur the cost of the device, plus the cost of the data, voice, and other support of services used on the device.

One alternative to this arrangement may be that employees, as well as vendors, patients, and visitors, can bring their own devices to the hospital and use those devices to conduct hospital-related business. However, these personal devices may not have adequate protection in order to isolate the hospital's data to prevent accidental or deliberate unauthorized transmission of confidential information by the user or intentional hacking of the device. As such, there remains a need in the art for methods and systems of isolating and protecting a plurality of personas, for example, hospital personas related to different departments or employee roles in the hospital. In another example, a manufacturer may want to protect trade secrets as well as employee and client or vendor records and may use a similar method. For visitors to or employees of a research or manufacturing facility, this may mean that once they enter the facility with their personal portable electronic device, features that could be used to capture and misappropriate information such as audio, video, camera, hard lines into ports, and internet access may be disabled. In an embodiment, this protection of confidential data may be accomplished by having shared devices within a business such as a hospital that are used by employees on different shifts which may reduce the cost of providing devices for the employees to use during their shifts. In an embodiment, even if the hospital provides its own devices and has a policy discouraging or prohibiting the use or presence of personal devices on premises, users may still do just that. In that case, the methods described herein may be used simultaneously, that is, an employee-owned device may have its functionality limited or disabled while in the hospital even if the employee (or patient, visitor, or vendor) is using a hospital-owned device while at work instead of their personal device.

The plurality of protected personas discussed herein may be generated by a business including its employees such as healthcare and IT professionals, or by a third party such as a consulting group. A persona may define access to a plurality of information on a remote network other than the telecommunication service provider's network that supports the device either as a primary provider or as a roaming provider. Each persona of the plurality of hospital personas and the original persona comprises a plurality of data, a plurality of applications, and a plurality of access rights to at least one of software, hardware, and firmware on the portable electronic device and the telecommunications service provider network. For example, an orthopedic surgery persona may comprise data regarding scheduled surgeries, patient post-operative results, patient pre-operative scans and tests, implant inventory, instrument inventory, monitoring inventory, and access to information regarding what other hospital resources both human and machine are scheduled for the scheduled surgeries. In another example, a patient persona in a children's ward may provide access to a plurality of games, electronic coloring books, fiction and non-fiction books, children's programming, and interactive surveys that may be used by clinicians to determine the location and severity of pain and other ailments that someone in a pediatric wing may otherwise have trouble communicating. In an embodiment, this type of diagnostic information may be sent from the patient's device to another device on the hospital network or may be otherwise stored in the patient's file.

In an embodiment, a user of a portable electronic device enters a hospital with their personal device that comprises a personal persona which may also be referred to as an original persona in this embodiment. The original persona may be a persona that is the factory (default) persona or may be a persona that has been modified or created by the user or a third party. The user may be a patient, hospital employee, vendor, visitor, or other party. The personal persona may provide or define access to a plurality of applications as well as access to hardware, software, firmware, and other networks and systems depending upon the type and configuration of the personal device. A hospital persona may be caused to be activated when an application on the portable electronic device receives a first trigger that indicates that the portable electronic device is within a predetermined proximity of a signal. In some embodiments, this activation may also be referred to as the loading of a hospital persona.

In an embodiment, the triggering may be in response to, and the hospital persona session established based on, a time and location limited token associated with the device. This token may be loaded on to the device so that the device can access the hospital's network when the application receives the trigger discussed above. The token may be a permanent access token or a limited access token such as a temporary token. A temporary token may be desired when a visitor or a vendor will be in the hospital for a limited amount of time. For example, if a medical device sales representative is on site to watch a series of surgeries over a period of a few days or a week, a limited-access token may be provided to the device of that sales representative or on a hospital-supported and owned device. In another example, a device user—regardless of whether that device is owned by the user or by the hospital—may only be allowed limited access to a generic hospital persona or a specific hospital persona. In that example, the token on the device used by that limited-access party may be a limited-access token. In some embodiments, the application on the portable electronic device or on the hospital (remote) network may check to see if the token on the device is still active. This check may be done on a periodic or dynamic basis or manually. If the token is determined to be inactive or nonexistent, the device's access to the hospital network may be terminated, for example, by deactivating any active hospital persona.

In an embodiment, the first trigger that activates a hospital persona may be one of a manual log-in or a dynamic process wherein the portable device receives a signal, for example, a Wi-Fi signal that triggers the activation of the hospital persona. In the case of a manual log-in as the first trigger, the log-in may be due to a push that occurs in response to the device sensing a signal or in response to the time and location limited token discussed above. This push may present the user of the device with the option to log into the hospital network, once logged in to the hospital network, even if they are logged in as a generic profile user without access to confidential information, access to the original persona may be restricted while the hospital persona is active.

In an embodiment, this hospital persona may be one of a plurality of hospital personas on a hospital network, which may be a generic hospital persona that is not specific to a department or a department-specific persona. A generic hospital persona may provide information for visitors such as maps, hours, services, a hospital directory, and other non-confidential information. This generic hospital persona may be made optional or mandatory because of concerns that parties who are not employees or vendors of the hospital may witness, capture, and distribute confidential information accidentally or intentionally and without authorization. In an embodiment, the generic hospital persona may also comprise games and reading materials, for example, if the device is intended for use in a children's hospital or other setting where it may be appropriate to provide a device to patients or other visitors who may spend extended periods of time in the hospital. The generic hospital persona may, in some embodiments, allow a user to log-in to other departments, applications, and/or systems on the hospital network. In some embodiments, the generic hospital persona may comprise confidential information and there may be a separate authorization used to access that portion of the generic hospital persona. In an embodiment, the first hospital persona may be activated on a device because of a token or agent that is pre-loaded on to the device, or the first hospital persona may be activated to every device that either logs in or receives a signal as described above. This activation may be an automatic switching to the hospital persona or may be received as a prompt for the device user to log in to the hospital persona. This may be because the hospital does not want to have devices on its premises that have active access to camera, audio, internet, or other features that may compromise—intentionally or unintentionally—patient or other confidentiality or that may distract other patients and employees in the hospital or interfere with hospital equipment or overall operations.

Activating this first hospital persona, regardless of whether it is generic or department-specific, restricts access to the personal (original) persona and all hardware, firmware, and software accessible while the personal persona is active. This restriction may also be referred to as partially or completely blocking access to different features that are accessible when the first persona is active. This may mean that features such as camera, audio, the web gateway, and other software, hardware, and firmware that could be used to capture and/or transmit confidential information in an unauthorized manner are disabled. In some embodiments, the first hospital persona may provide access to patient information, surgery schedules, outpatient schedules, and the ability to further log in or otherwise request information from systems and applications accessed through the generic hospital persona. While the first hospital persona is activated on the device, the user may create, delete, or otherwise modify data on the hospital's network that can be accessed from the hospital persona which cannot be accessed when the personal (original) persona is enabled. The first hospital persona may remain active on the portable device until it is unloaded in response to a second trigger. The second trigger may comprise a manual log out by the user, or may be based upon the portable device no longer receiving a signal, for example, the Wi-Fi signal that led to activating the first hospital persona. The signal may no longer be received, in one example, because that device has moved out of a location or out of a predetermined proximity of a location where the signal is available. In one example, a portable electronic device may have the first hospital persona activated in response to a first dynamic trigger and may be able to access this first hospital persona within the physical boundaries of the hospital, i.e. within the walls of the hospital. The device may also be able to access the first hospital persona in courtyards of the hospital, in restaurants or shops adjacent to and/or affiliated with the hospital, and in the parking lot or lots associated with or within a predetermined radius and/or perimeter around the hospital which may be referred to as the predetermined area. However, once the device leaves this area, the first hospital persona would be deactivated as discussed below.

Once the user either logs out manually or leaves the predetermined area of the first trigger, the second trigger may remove the generic hospital persona and restore access to the personal persona. Restoring access to the personal persona, which may also be referred to as reactivating the personal persona, may also restore access to restricted hardware, software, and firmware including web browsers, cameras, audio, other physical ports and sensors, infrared, Bluetooth®, etc. Prior to the portable electronic device receiving the second trigger, while the first hospital persona is activated on the device, a plurality of data on the hospital network and accessed applications and systems associated with the first hospital persona may be created, deleted, or otherwise modified. The data that may be created and or modified may concern patient records, machine maintenance, and medical supplies and delivery schedules. The plurality of data may be uploaded dynamically, at predetermined intervals, or manually to a server on the hospital network. It may be preferable to capture any created or modified data prior to deactivating the persona under which the data was accessed/created/modified. A portion of data that is accessed/created/modified while a particular hospital persona is active may be temporarily stored in the trusted security zone. For example, a device is used during a twelve-hour shift where a number of patients are treated. If the data that is accessed, modified, or created is uploaded and the respective access to that data logged, every thirty minutes, some of the data may not be uploaded to the hospital network before the shift ends. In that example, the data would remain in the trusted security zone on the device until any hospital persona is loaded at which point the data is uploaded to the hospital network. Alternatively, the data may be accessed by an authorized party, for example, in IT at the hospital. In an embodiment, if the first hospital persona is logged out manually, any modifications made may be uploaded to a server on the hospital network. In an alternate embodiment, if the first hospital persona is deactivated because the signal that triggered the activation of the first hospital persona is no longer received by the portable electronic device, the modified data may be loaded to a trusted security zone on the device that may not be accessed when the personal persona is loaded.

A trusted security zone provides chipsets with a hardware root of trust and a secure execution environment for applications, and secures access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532, 588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions.

The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

In that embodiment, wherein a trusted security zone is used, the information created and/or modified may remain on the device until the first hospital persona, or any hospital persona from the plurality of hospital personas, is reactivated, at which point it may be automatically loaded to the server on the hospital network. Alternatively, an IT professional from the hospital may access the information on the device and upload it manually to the server. In another embodiment, if the first hospital persona is logged out because the signal that triggered activation of the first hospital persona is no longer received by the operating system or application on the device, a portion of the data modified while the first hospital persona was activated may have been dynamically or manually uploaded to the server on the hospital network, and a portion of the data modified may be stored in the trusted security zone on the device. Information stored in the trusted security zone may be uploaded to the hospital's network automatically the next time that the portable electronic device has a hospital persona activated, regardless of whether the hospital persona activated is the same as the first hospital persona.

In an alternate embodiment, a user may begin with a device owned and/or maintained by the hospital. This portable electronic device may be assigned to a particular party, employee role, department, or may be for general use as needed by employees and visitors. The portable electronic device may comprise a generic hospital persona which also may be referred to as the original persona. Upon entering a department, for example, the cosmetic surgery department, a first trigger that may be a manual log-on or a dynamic trigger as discussed above may activate the cosmetic surgery persona on the device and access to the generic hospital persona may be restricted. If the portable electronic device then migrates to another department, for example, orthopedics, the cosmetic surgery persona may be unloaded and an orthopedics persona, that is also a persona of the plurality of hospital personas, may be activated in response to a second trigger that may be similar to the first trigger discussed above. A device may migrate because an employee, vendor, or other visitor is physically located in another department, or because the device is re-appropriated to a new department.

In an embodiment, the orthopedics persona may provide access to a plurality of applications and other systems access that may overlap in part with the cosmetic surgery persona, or the accessible areas may be completely different from those associated with the cosmetic surgery persona. The data modified during the period when either the cosmetic surgery persona or the orthopedics persona is activated may be stored in a trusted security zone or on the hospital network in a fashion similar to what is described above and may be dependent upon how the persona is deactivated. In an embodiment, when the orthopedics persona is deactivated in response to one of a manual or an automatic trigger, either the cosmetic surgery persona or the generic hospital persona may be activated and/or have access restored. When a persona is restored, access is restored to the applications, systems, and data on the hospital network, and data stored in the trusted security zone on the portable electronic device that may not have been uploaded when the previous hospital persona was active may be uploaded to the hospital network without user interaction or awareness.

FIG. 1 is a system for implementing methods according to embodiments of the present disclosure. Mobile device 106 may comprise a plurality of virtual machines 110 that may comprise at least one persona. For purposes of FIG. 1, persona 108 reflects a persona associated with remote network 114, however, it is understood that the mobile device 106 may also comprise a personal or original persona with access to the telecommunications service provider's network 120 as well as a plurality of applications, connectivity, hardware, firmware, and software. A persona may provide access to a remote network 114 such as a hospital network. While connected to the remote network 114, a plurality of data 108a from the remote network 114 may be accessed, created, and modified on the mobile device 106.

In an embodiment, confidential or sensitive data that is accessed, created, or modified while the persona 108 is active may be stored on the mobile device 106 temporarily. This access, as well as the storage, may be done according to a plurality of rules and/or policies 108b as well as logic 108c associated with the persona 108. The plurality of rules and/or policies 108b and logic 108c may comprise information about what information may be accessed, how it may be accessed, if/how it may be modified, and when this access and/or modification can occur. The mobile device 106 may comprise an application 124 and be configured in a manner similar to what is described below with respect to FIGS. 4, 5, 6A, and 6B. In one example, a private persona may comprise a plurality of applications, systems, access, and settings that a user of the mobile device 106 may access when the private persona is activated. A hospital persona may comprise applications, systems and access to a plurality of data on the hospital network, some of which is confidential, that cannot be accessed when the private persona is activated.

A network 120 may be the network of a telecommunications service provider that provides voice and/or data services to the mobile device 106. The network 120 may comprise one or more public communication networks, one or more private networks, and/or a combination thereof. The system may further comprise a base transceiver station (BTS) 102 in communication with the wireless network 120 in communication that is also in communication with a wireless access point 104. The network 120 may also be in communication with a server computer 122 and a data store 112. A remote network 114, for example, a hospital's network, may not be in communication with the network 120 but may communicate with the mobile device 106 to activate and deactivate a plurality of virtual machines that may be similar to virtual machine 110. Alternatively, the network 114 may be communicatively coupled to the remote network 120, via security gateways in the remote network 114 that restrict communication traffic both into and out of the remote network 114. The remote network 114 may comprise a wireless network access node 116 and a data store 118. The data store 118 may comprise a plurality of personas, for example, hospital personas. Each hospital persona may be associated with at least one of a hospital department, a role within a hospital, or a combination of department and role. The hospital departments may comprise an emergency department, radiology, cosmetic surgery, orthopedics, dermatology, pediatrics, purchasing, receiving, maintenance and facilities, administration, which may also be a role, as well as other departments such as surgical, operating room, post-operative, intensive care, neo-natal, neo-natal intensive care, ambulatory, triage, neurosurgery, neuroscience, and combinations thereof. The hospital roles may comprise doctors, medical students, interns, residents, fellows, support staff, nursing, physician's assistants, administrative staff, board, chief-level employees, and other roles as appropriate that may be part time, full time, contract-based, or volunteer.

The persona(s) activated on a user's device may depend on the location of the device within the hospital, the role of the user and/or of the device in the hospital, or combinations thereof. For example, the information seen by a doctor in an operating room or theater may not be the same information seen by a vendor who is in the operating room to watch a surgery even though both devices in the possession of the doctor and the vendor have activated an operating room persona. Activation of the hospital persona may be accomplished by a log-in, or, in some embodiments, by an association of a device identifier with a role of the owner or user of that device by the hospital network. In some embodiments, the remote network 114 may connect to the telecommunication service provider's network 120 by a secure connection comprising firewalls and other protections to prevent unauthorized access to confidential and other protected hospital information. In some embodiments, these protections may restrict or disable the ability of a user to send data out from remote network 114 to the telecommunications service provider's network 120 and may, conversely, prevent receiving data sent from the network 120 when the persona 108 in communication with the remote network 114 is active on the mobile device 106.

In an embodiment, the mobile device 106 also comprises an operating system (not pictured) and is owned and/or used by an individual user visiting the hospital. The individual user may be a doctor, nurse, patient, visitor, vendor, support staff, or administrator. The application 124 on the mobile device 106 may receive a signal from the wireless access point 104 upon coming within a pre-determined proximity of the hospital, or may log-in to the hospital network manually with the proper authorization. Either event may be referred to as a first trigger, and may cause a persona 108 to activate on the mobile device 106. The other persona 108 may comprise access to a plurality of systems and applications on the remote network 114 which may store data, including confidential data, in a data store 112. This data may be accessed, modified, created, or deleted while the other persona 108 is activated on the mobile device 106. In addition to providing access to confidential data on the hospital network, activating the persona 108 on the mobile device 106 may restrict access to applications, systems, hardware, firmware, and other software on the mobile device 106 that could be accessed while the an original persona (not pictured) was activated.

In an embodiment, when access is restricted or disabled, the user of the device may not be able to access the telecommunications service provider's network 120. In addition, access to applications, systems, and physical ports of the mobile device 106 may be limited. In one example, the camera function may be restricted, but the audio port may remain active when the other persona 108 is active and the personal persona is deactivated. Thus, original persona is deactivated while the other persona 108 is activated on the device. The data from the data store 112 that is used, created, and/or modified while the persona 108 is activated on the mobile device 106 may be stored on the remote network 114 or in a trusted security zone (not pictured) on the mobile device 106 or on a combination of both. In one example, the data associated with the other persona 108 that is used, created, modified, or otherwise accessed while the other persona 108 is activated on the mobile device 106 is backed up and/or loaded on the remote network 114. This upload may occur dynamically, manually, or in response to a predetermined amount of time passing, a predetermined amount of data being accessed or modified, or by a combination of methods. If a user manually logs out of the hospital persona 108, all of the data may be uploaded to the remote network 114.

If a user is logged out of the persona 108 because of a trigger wherein the wireless signal for the persona is no longer received by the mobile device 106, a portion of the data may be stored in a trusted security zone on the mobile device 106. This portion of the data may be uploaded automatically the next time the persona 108, or any persona of the plurality of personas of the remote network 114, is activated on the mobile device 106, or may be manually uploaded by an IT administrator of the hospital if the device is given to the IT administrator or another party authorized to transfer data to the remote network 114. When the persona 108 is unloaded, whether by manual or automatic trigger, the private persona may be restored to the mobile device 106 which may reestablish access to the applications, systems, hardware, software, and firmware associated with the private persona on the mobile device 106. In an alternate embodiment, the mobile device 106 may be owned by the hospital, and the private persona may be a generic hospital profile. This embodiment is discussed below in FIG. 3.

Figure 2:
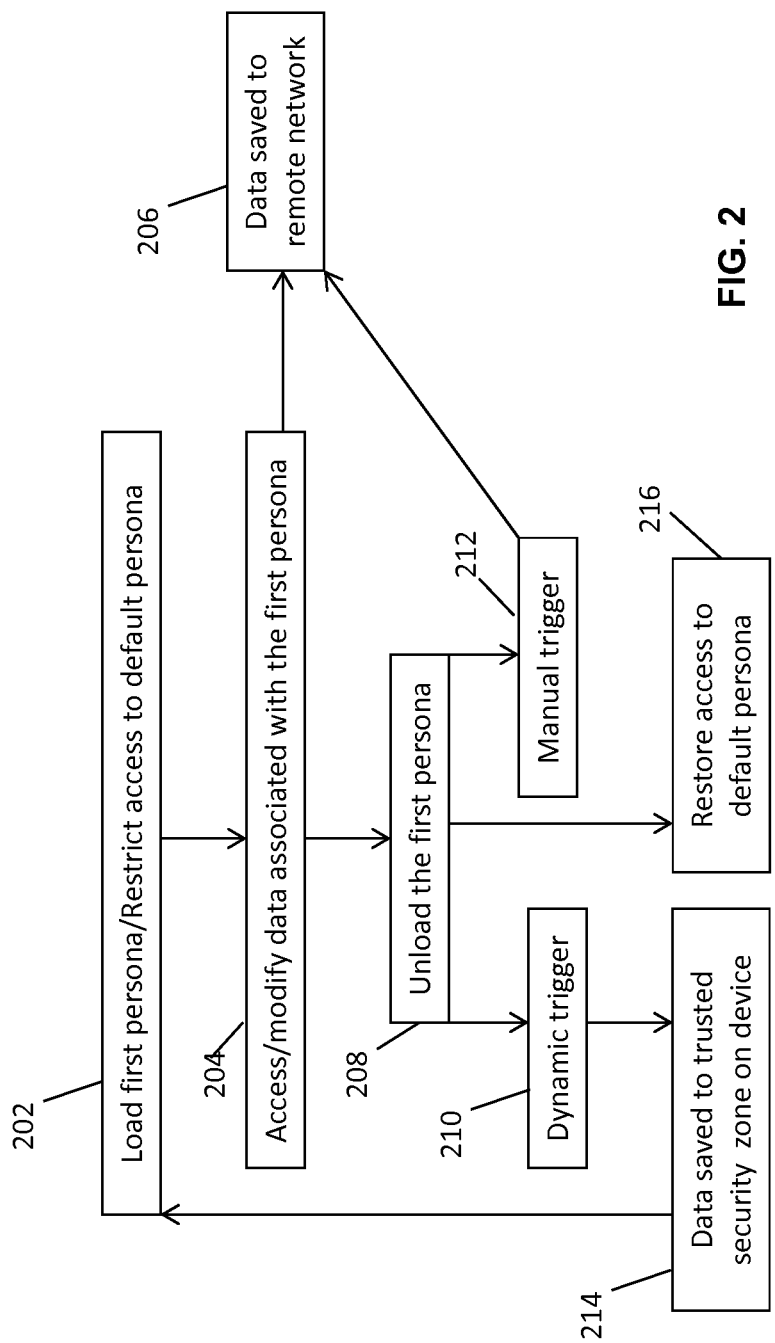
FIG. 2 is a flow chart of a method of protecting access to a plurality of personas according to an embodiment of the disclosure.

FIG. 2 is a flow chart of a method of protecting access to a plurality of personas according to an embodiment of the present disclosure. At block 202, a first persona, for example, a hospital persona of a plurality of hospital personas is activated on a mobile device such as discussed in FIG. 1. Also at block 202, access is disabled to the original persona on the mobile device, which may also be referred to as disabling the original persona. In this embodiment, the mobile device is a personal device or a device provided to someone in the hospital by a party other than the hospital that is not owned or maintained by the hospital, for example, a vendor with a phone provided by the vendor's employer. The hospital persona may be activated in response to a first trigger which may be a manual or dynamic trigger similar to what is discussed below at blocks 210 and 212. The manual trigger may comprise a log-in or placing the device within the proximity of a trigger such as a Bluetooth® or infrared signal, the dynamic trigger may comprise the device receiving a wireless signal that may be broadcast within the hospital, hospital-affiliated businesses located nearby, and/or within a particular radius of the hospital. At block 204, a plurality of data associated with the hospital persona may be accessed and/or modified. The plurality of data associated with the hospital persona that is activated at block 202 may be accessed through applications, systems, ports, or interfaces that are accessible when the hospital persona is activated on the mobile device at block 202. As data is accessed and/or modified at block 204, the updated data and/or access records may be saved to a remote network, for example, the hospital's network, on a hospital server at block 206.

Access records that reflect the date and time that various records were viewed and/or modified in addition to the device that accessed the data may also be stored on the remote network 114 in addition to any data created or modified while a hospital persona is active based on in-house policies or governing law. The access records and data created or modified may be saved dynamically, by manual trigger, based on a predetermined amount of data being modified or accessed, or based on a predetermined amount of time spent in the hospital personal, or combinations thereof. At block 208, the first hospital persona is deactivated in response to a second trigger comprising at least one of a manual trigger at block 212 or a dynamic trigger at block 210. The manual trigger 212 may be, for example, logging out of the first hospital persona, or a Bluetooth® or other trigger wherein the device is passed over a signal source upon exiting the hospital. The dynamic trigger 210 may be, for example, the device no longer receiving the wireless signal that triggered the loading of the first hospital persona at block 202. In another embodiment, a GPS signal may be received by the device to activate the first hospital persona at block 202.

In an embodiment, if the manual trigger 212 is used, the data that was modified/created during the time the hospital persona was activated on the device may be saved to the remote network at block 206. If the first hospital persona is deactivated at block 208 by the dynamic trigger 210, a portion of the data that was modified/accessed may have been saved to the remote hospital network at block 206, and a portion of the data may be saved to a trusted security zone on the device at block 214. This trusted security zone may be accessed by the hospital network the next time the hospital persona is activated on that device so that the accessed/modified data can be uploaded to the network. Alternatively, a hospital employee with appropriate credentials may manually unload the information from the device. At block 216, subsequent to the first hospital persona being deactivated at block 208, regardless of how the deactivation is triggered, access to the original persona may be restored. Restoring access to the original persona at block 216 may comprise restoring access to applications, applets, audio functions, camera and video functions, as well as physical ports. A business such as a hospital may want to disable access to these types of functions because they do not want hospital records or pictures of patients or other information being copied and distributed.

Figure 3:
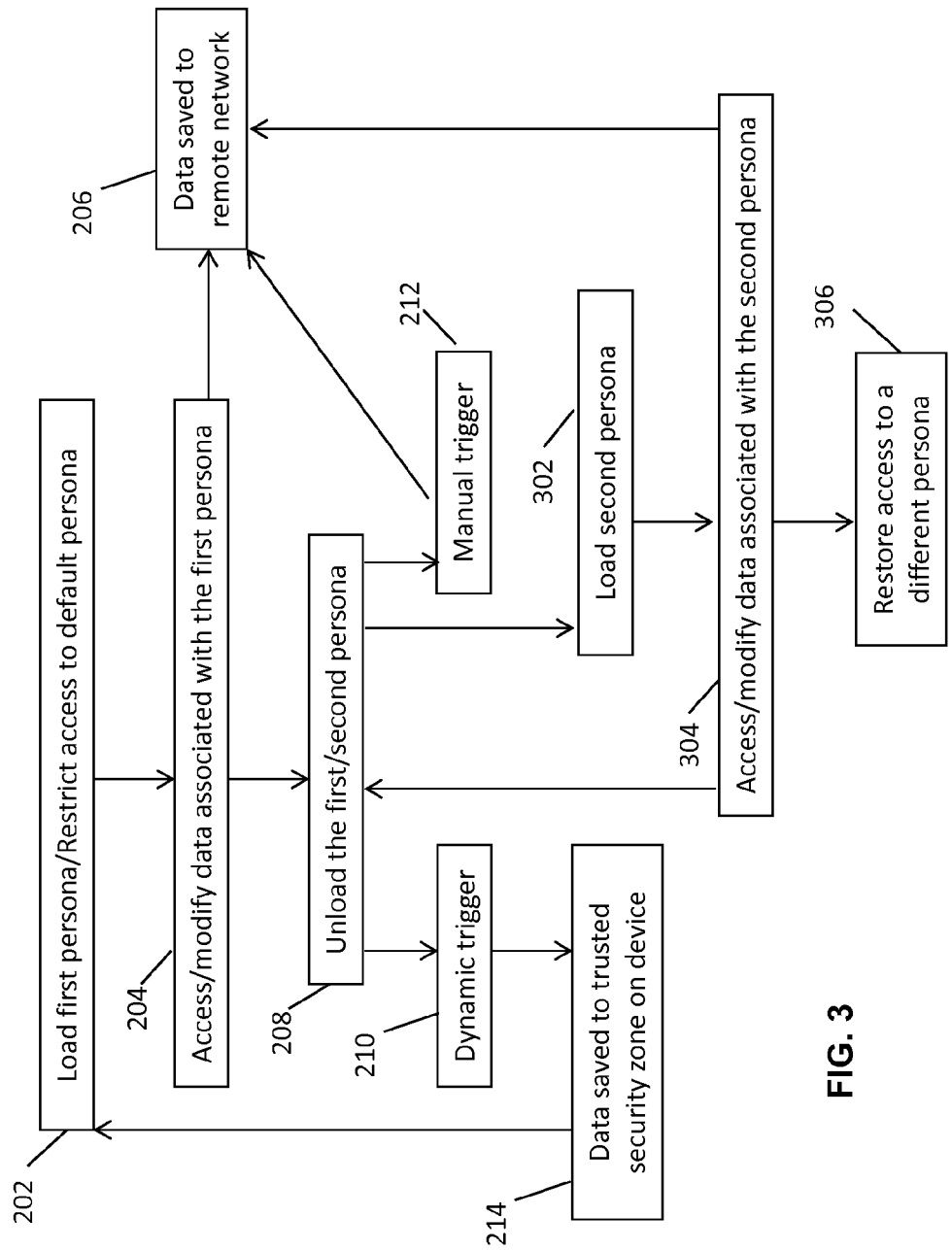
FIG. 3 is a flow chart of a method of protecting access to a plurality of personas according to an embodiment of the disclosure.

FIG. 3 is a flow chart of a method of protecting access to a plurality of personas according to an embodiment of the present disclosure. The method may proceed through blocks 202-214 as discussed with respect to FIG. 2. However, in this embodiment, the mobile device is a hospital owned and/or hospital-maintained device. The persona on the mobile device may comprise a generic hospital persona that includes hospital maps, meal menus, dining locations, shop locations, nearby business information, a hospital directory, and other information that is not considered by the hospital or by the laws governing its operation to be confidential information. In an alternate embodiment, the original persona may provide access to limited confidential information and, in this embodiment, an initial log-on may be used to authenticate the user on the original persona. At block 302, subsequent to the first hospital persona being deactivated at block 208, a second hospital persona may be activated. The first hospital persona may be, for example, a cosmetic surgery persona associated with the cosmetic surgery department and, in some embodiments, related departments such as radiology or dermatology. The second hospital persona may be, for example, an orthopedics persona associated with the orthopedics department and, in some embodiments, related departments such as radiology or physical therapy. When the orthopedics persona is activated at block 302, data associated with that persona may be accessed and/or modified at block 304 through applications, applets, or other interfaces that provide access to data on the hospital's network. The second hospital persona may be deactivated at block 208 as discussed with respect to FIG. 2 and the method may proceed through blocks 208-214 as discussed above. In an embodiment, additional hospital personas may be activated subsequent to the orthopedics (second hospital) persona in a similar manner as discussed above without access to the original persona being restored. In another embodiment, the original persona may be restored in between each hospital persona being activated. At block 306, access may be restored to either the original persona (generic hospital persona) or the cosmetic surgery persona. Restoring a different hospital persona after another hospital persona is deactivated restores access, as discussed above, to firmware, hardware, and software that was restricted from access/use when another hospital persona was activated on the device at blocks 202 and/or 302.

Figure 4:
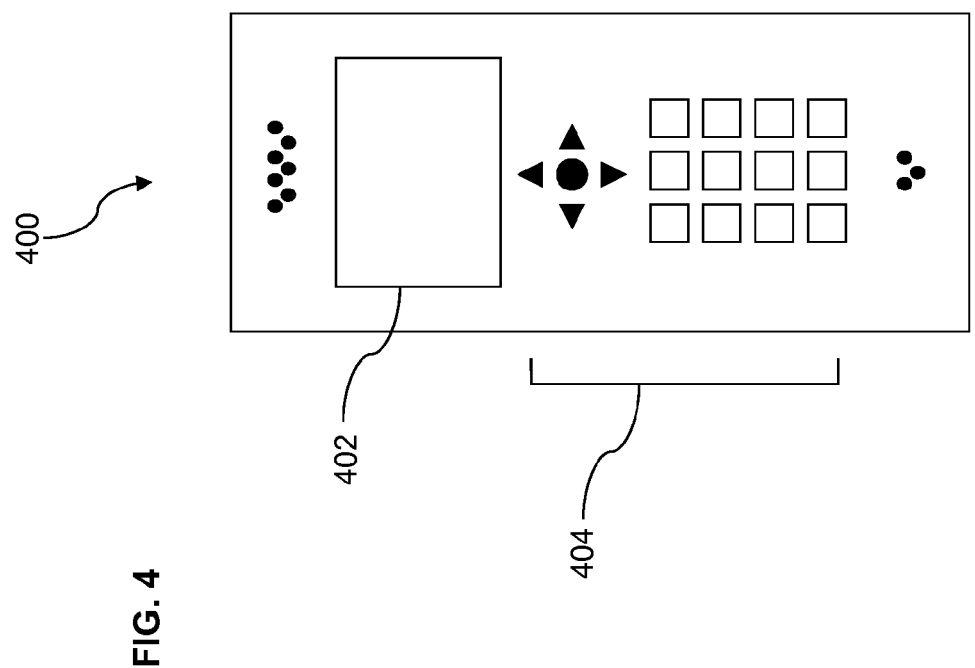
FIG. 4 depicts a mobile device which is operable for implementing aspects of the disclosure.

FIG. 4 depicts the mobile device 400, which is operable for implementing aspects of the present disclosure, but the present disclosure should not be limited to these implementations. Though illustrated as a mobile phone, the mobile device 400, which may be similar to mobile device 106 in FIG. 1, may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
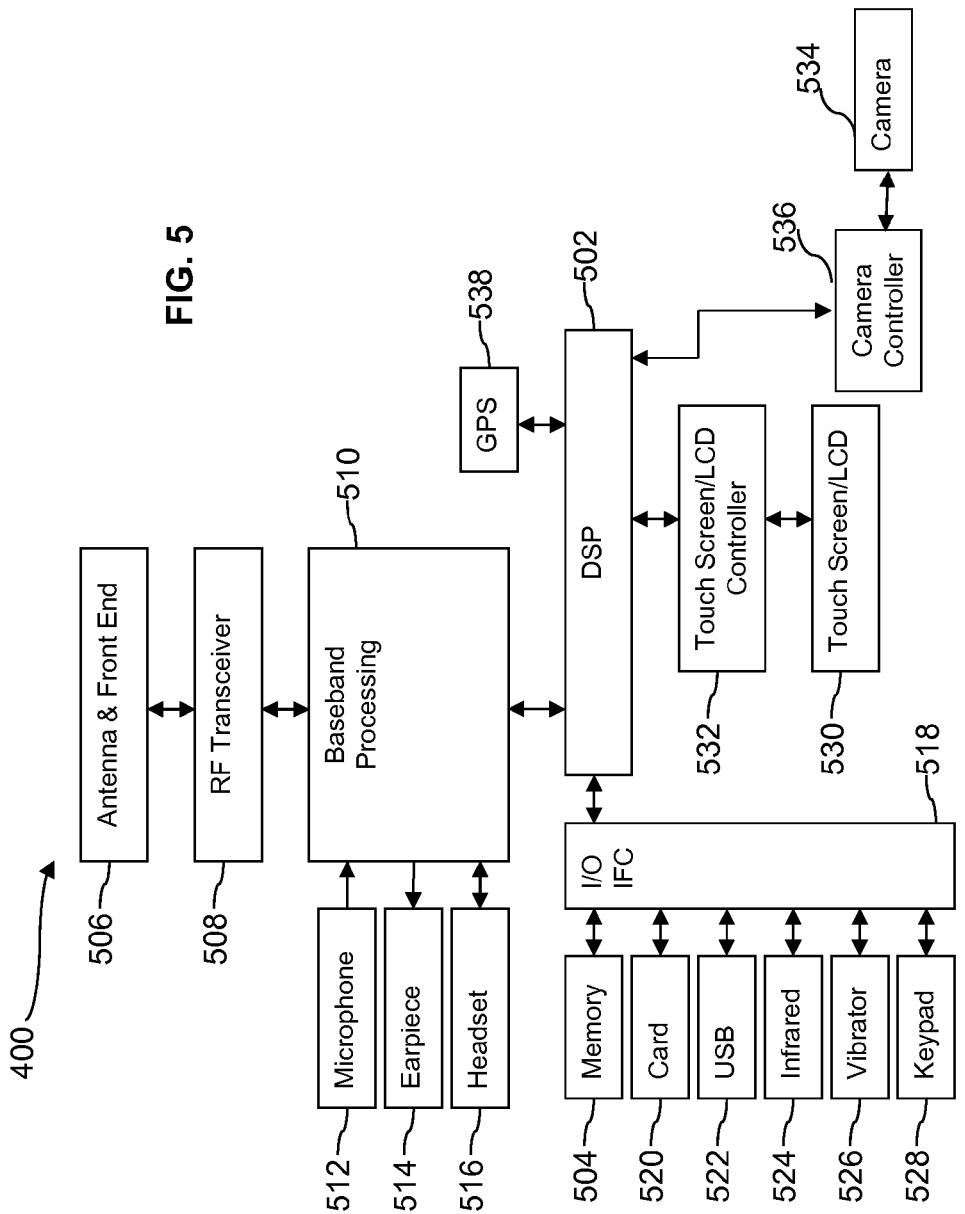
FIG. 5 shows a block diagram of a mobile device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
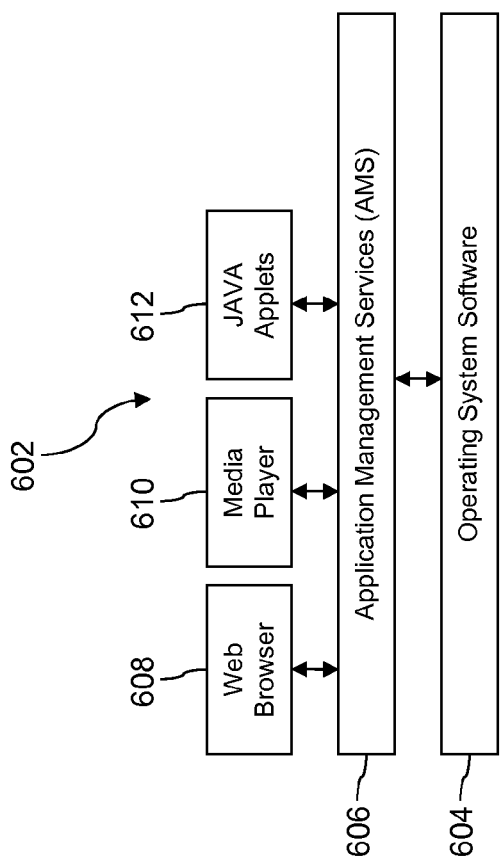
FIG. 6A illustrates a software environment of a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
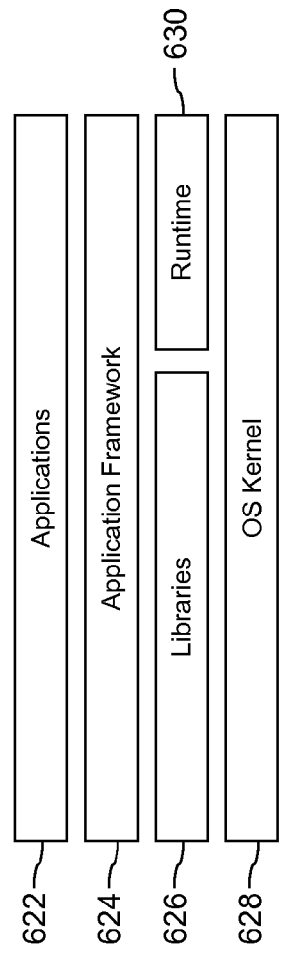
FIG. 6B illustrates an alternative software environment of a mobile device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
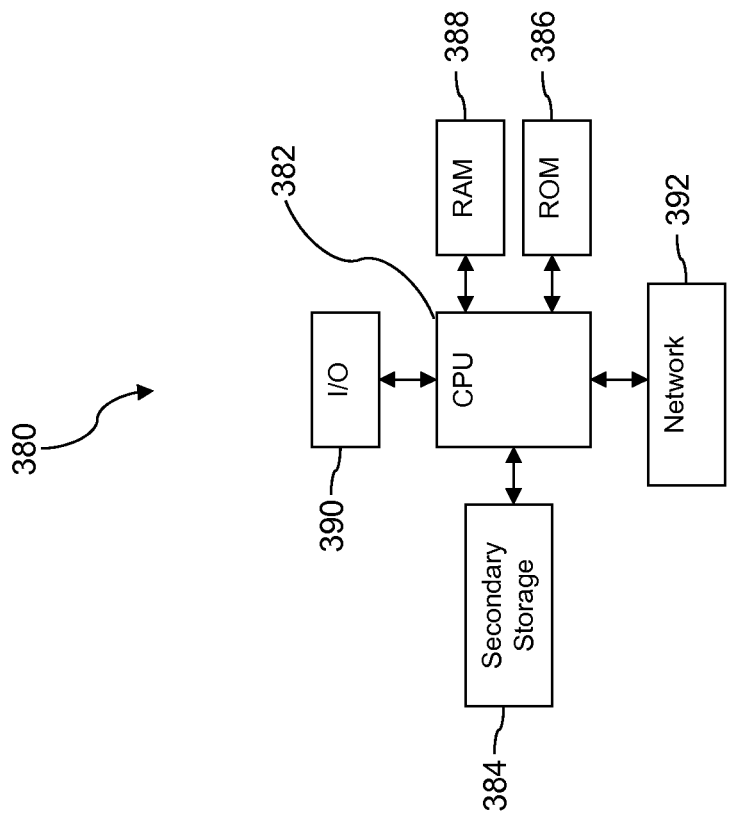
FIG. 7 illustrates a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors; liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of protecting information on a hospital network comprising:
    loading, by an application on a portable electronic device having an original persona, a hospital persona that is different from the original persona, wherein the hospital persona comprises a hospital plurality of data, a hospital plurality of applications, and a hospital access right to a hospital network;
    subsequently activating the hospital persona and deactivating the original persona, by the application, in response to an activation trigger, the activation trigger comprising at least one of a manual activation trigger or a dynamic activation trigger, wherein activating the hospital persona comprises restricting access to at least one of an original software, hardware, or firmware on the portable electronic device associated with the original persona;
    accessing, by the portable electronic device while the hospital persona is activated, at least a portion of the hospital plurality of data, wherein accessing the at least the portion of the hospital plurality of data comprises creating or modifying the least the portion of the hospital plurality of data; and
    deactivating, by the application, in response to a deactivation trigger comprising at least one of a manual deactivation trigger or a dynamic deactivation trigger, the hospital persona, wherein the deactivating comprises:
        determining if the deactivation trigger is the manual deactivation trigger or the dynamic deactivation trigger;
        storing, in response to the determination, the at least the portion of the hospital plurality of data, wherein the at least the portion of the hospital plurality of data is stored in the hospital network when the deactivation trigger is the manual deactivation trigger, and wherein when the deactivation trigger is the dynamic deactivation trigger, the at least the portion of the hospital plurality of data is temporarily stored in a trusted security zone on the portable electronic device until a subsequent activation of the hospital persona when the at least the portion of the hospital plurality of data is uploaded from the trusted security zone to the hospital network; and
        reactivating, in response to the deactivation trigger, the original persona on the portable electronic device, wherein the original persona runs on a first virtual processor and the hospital personal runs on a second virtual processor, and wherein the first virtual processor and the second virtual processor run on a single physical processor executing in a time-sliced fashion by switching contexts between the first and second virtual processors to share processor resources.

2. The method of claim 1, wherein the original persona comprises an original plurality of data, an original plurality of applications, and an original plurality of access rights to a telecommunications service provider network and the original plurality of software, hardware, and firmware on the portable electronic device associated with the original persona.

3. The method of claim 1, wherein reactivating the original persona comprises reactivating access to the original plurality of hardware, software, and firmware on the portable electronic device associated with the original persona.

4. The method of claim 3, wherein reactivating the original persona comprises reactivating access to audio ports, video ports, camera functions, recording functions, and ports.

5. The method of claim 1, wherein the manual activation trigger comprises the application receiving at least one userID and at least one password, and wherein the dynamic activation trigger comprises activating the hospital persona in response to the portable electronic device being in at least one of a predetermined location or within a radius of the predetermined location.

6. The method of claim 1, wherein the hospital plurality of data associated with the hospital persona is not stored locally on the portable electronic device and is one of stored on the remote server, the trusted security zone, or is removed from the portable electronic device and deleted in response to deactivating the hospital persona.

7. A system for protecting access to information on a hospital network comprising:
    a plurality of hospital personas accessible through a hospital network, wherein each hospital persona of the plurality of hospital personas on the hospital network comprises a hospital plurality of data, a hospital plurality of applications, and a hospital access right to the hospital network; and
    the portable electronic device on a telecommunications service provider network comprising a trusted security zone, an application, and an original persona, wherein the original persona is different than the plurality of hospital personas;
    wherein the application:
        loads a hospital persona of the plurality of hospital personas;

subsequently activates, in response to an activation trigger, the hospital persona, wherein the activation trigger is one of a manual activation trigger or a dynamic activation trigger, and wherein activating the hospital persona deactivates access to the original persona and restricts access to at least one of an original software, hardware, or firmware on the portable electronic device associated with the original persona;

deactivates, in response to a deactivation trigger, the hospital persona and activates a different hospital persona, wherein the deactivation trigger is one of a manual deactivation trigger or a dynamic deactivation trigger;

in response to the deactivation trigger being the dynamic deactivation trigger, temporarily stores at least a portion of the hospital plurality of data in the trusted security zone on the portable electronic device until a subsequent activation of the hospital persona when the at least the portion of the hospital plurality of data is uploaded from the trusted security zone to the hospital network; and deactivates the different hospital persona and reactivates the hospital persona or reactivates the original persona, wherein the original persona runs on a first virtual processor and the hospital personal runs on a second virtual processor, and wherein the first virtual processor and the second virtual processor run on a single physical processor executing in a time-sliced fashion by switching contexts between the first and second virtual processors to share processor resources.

8. The system of claim 7, wherein the dynamic activation trigger comprises the portable electronic device detecting that it is within a predetermined location or within a predetermined radius of the predetermined location, and wherein the manual activation trigger comprises authenticating a userID and a password.

9. The system of claim 7, wherein deactivating in response to the manual deactivation trigger deactivates the hospital persona and stores a plurality of data accessed while the hospital persona was active on a server in the hospital network.

10. The system of claim 7, wherein deactivating in response to the dynamic deactivation trigger deactivates the hospital persona and stores a plurality of data accessed while the hospital persona was active to a trusted security zone on the portable electronic device.

11. The system of claim 7, wherein the hospital persona is associated with at least one of a first department or a first role in a hospital.

12. The system of claim 11, wherein the different hospital persona is associated with at least one of a second department or a second role in the hospital.

13. The system of claim 7, wherein the dynamic activation trigger comprises the hospital network detecting a token on the portable electronic device, wherein the token comprises a plurality of access rights that are at least one of time or location-limited.

14. A method of protecting information in a remote network comprising:

loading, by an application on a portable electronic device, a persona that is different from an original persona, wherein the persona comprises a plurality of data, a plurality of applications, and a plurality of access rights to at least one of a network or a plurality of software, hardware, and firmware on the portable electronic device associated with the persona, and wherein the original persona comprises an original plurality of data, an original plurality of applications, and an original plurality of access rights to an original plurality of software, hardware, or firmware on the portable electronic device associated with the original persona or a telecommunications service provider network;

subsequently activating, by the application, in response to an activation trigger, the persona, the activation trigger comprising at least one of a manual activation trigger or a dynamic activation trigger, wherein activating the persona deactivates access to the original persona stored on the portable electronic device and restricts access to at least one of the original plurality of software, hardware, or firmware on the portable electronic device associated with the original persona;

deactivating, by the application, the persona in response to a deactivation trigger, wherein the deactivation trigger is one of a manual deactivation trigger or a dynamic deactivation trigger;

in response to the deactivation trigger being the dynamic deactivation trigger, temporarily storing, by the application, at least a portion of the plurality of data of the persona in a trusted security zone on the portable electronic device until a subsequent activation of the persona when the at least the portion of the plurality of data is uploaded from the trusted security zone to the remote network, wherein the remote network is not the network that supports the original persona; and reactivating the original persona on the portable electronic device, wherein the original persona runs on a first virtual processor and the personal runs on a second virtual processor, and wherein the first virtual processor and the second virtual processor run on a single physical processor executing in a time-sliced fashion by switching contexts between the first and second virtual processors to share processor resources.

15. The method of claim 14, wherein the manual activation trigger comprises the application receiving at least one userID and at least one password.

16. The method of claim 14, wherein the dynamic activation trigger comprises activating the original persona in response to receiving a signal that the portable electronic device is in a predetermined location or within a radius of a predetermined location.

17. The method of claim 14, wherein one or more of the plurality of applications associated with the persona is stored at least one of locally on the portable electronic device or on the remote network.

18. The method of claim 14, wherein deactivating access to the original persona comprises deactivating access to at least one of the original plurality of data, the original plurality of applications, and the original plurality of access rights to the telecommunications service provider network or the original plurality of software, hardware, and firmware on the portable electronic device associated with the original persona.

* * * * *